March 1, 1966   P. E. SEABORN   3,237,743
SLIDE REJECT CONVEYOR
Filed Aug. 12, 1963
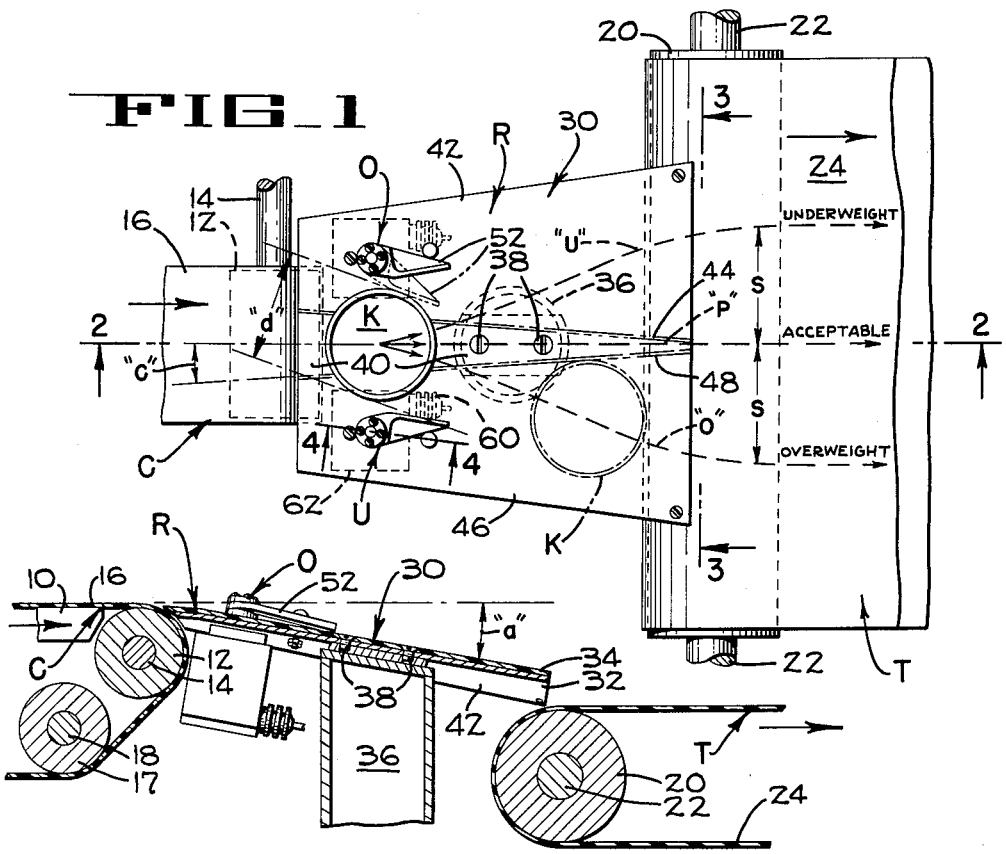
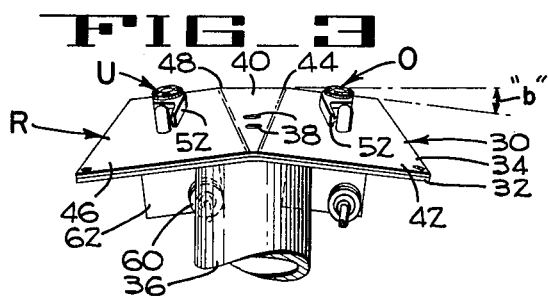
INVENTOR
PAUL E. SEABORN
BY *Hans G. Hoffmeister*
ATTORNEY

3,237,743
SLIDE REJECT CONVEYOR
Paul E. Seaborn, Los Gatos, Calif., assignor to FMC Corporation, San Jose, Calif., a corporation of Delaware
Filed Aug. 12, 1963, Ser. No. 301,459
2 Claims. (Cl. 193—31)

This invention relates to the segregation of articles that have previously been classified, and more particularly relates to a slide reject conveyor for receiving linearly moving articles from an article-classifying device, segregating the articles, and conveying them to a segregated article takeaway device.

It is an object of the present invention to provide a slide reject conveyor of the type referred to, which does not require the use of conveyor belts or other mechanical devices for positively advancing the articles along the reject conveyor.

Another object of the invention is to provide a reject conveyor of the type described that is suitable for high-speed operation, and which provides article deflectors for segregating the articles. In accordance with the present invention the deflectors need not project very far into the path of the oncoming articles, which minimizes the impact effect of the deflectors upon the articles; and yet the articles are separated into various classes by a distance that is great enough to facilitate the ultimate segregation of the articles of the various classes, as they leave the takeaway conveyor following the reject conveyor of the invention.

It is a further object of the invention to utilize the force of gravity as an assistance in transporting the articles across the slide reject conveyor, and in increasing the separation of the paths of the articles of the various classes.

A further object of the invention is to provide a slide reject conveyor of the type described that is of extremely simple and economical construction.

Another object of the present invention is to provide a reject conveyor of the type described wherein the article supporting surface of the conveyor has a tough anti-friction surface, for facilitating the movement of articles across the conveyor in response to momentum and gravity forces acting upon such articles.

The manner in which these and other objects and advantages of the present invention may be attained will be apparent from the following detailed description of the invention.

In the drawings:

FIGURE 1 is a plan of the slide reject conveyor of the present invention, with a fragmentary showing of an article classifying device that delivers articles to the conveyor, and an article takeaway conveyor. In FIGURE 1 the platform of the slide reject conveyor of the invention is illustrated as lying in a single plane, for clarity of illustration.

FIGURE 2 is a vertical section of the reject conveyor and associated units, taken along the lines 2—2 of FIGURE 1.

FIGURE 3 is an end elevation of the slide reject conveyor of the present invention, taken from the delivery end thereof as indicated at lines 3—3 in FIG. 1, and with the classifying and takeaway devices not shown.

FIGURE 4 is a section at lines 4—4 of FIG. 1 taken through one of the deflector and rotary solenoid units mounted on the slide reject conveyor of the present invention.

Referring to the drawings, the slide reject conveyor R of the present invention is shown interposed between an article-classifying device C, and an article takeaway device T in the form of a conventional endless belt conveyor. The slide reject conveyor of the present invention includes solenoid operator deflector assemblies, including an overweight deflector assembly O, and an underweight deflector assembly U. Details of the classifying device C that directs linearly moving articles, such as cans K, to the slide reject conveyor R of the present invention, are not critical to the present invention, so long as the classifying device presents linearly moving articles to the reject conveyor. A classifying device C that is suitable for use in conjunction with the slide reject conveyor R of the present invention, is disclosed and claimed in the pending application of Seaborn, Serial No. 325,097, filed November 20, 1963, and assigned to the assignee of the present invention.

Referring to FIGURES 1 and 2, the classifying device C includes a scale platform 10, of which only the article delivery end appears in FIGURE 2, a weight belt pull roller 12, and a roller shaft 14. A drive roller 17 and its shaft 18 also appears in FIG. 2, the shaft 18 being driven by a mechanism not shown, such as the mechanism illustrated and described in aforesaid pending application. Passing over the scale platform 10, and the rollers 12 and 17, is a weight belt 16, which linearly carries articles, such as cans K, across the scale platform 10 and delivers them to the slide reject conveyor R of the present invention.

As is also seen in FIGURES 1 and 2, the takeaway device or conveyor T includes an idler roller 20, an idler roller shaft 22, and a flexible endless conveyor belt 24. The driving roller for the conveyor belt 24 does not appear in the drawings and the details of the conveyor and of this drive are not critical to the invention. Any conventional type endless conveyor belt having a belt of sufficient width may be employed for use as the takeaway device T, illustrated and described.

As mentioned, the slide reject conveyor R of the present invention is mounted between a classification device C and a takeaway conveyor T, as shown in FIGURES 1 and 2. The slide conveyor R includes a composite platform 30, which includes a metal base plate 32 bonded to a cover 34 formed of a tough, low friction material, such as a tetrafluoroethylene polymer. The platform 30 is supported on a pedestal 36, which has a base (not shown) for mounting the platform between the aforesaid classifying and takeaway devices C and T. The platform 30 is mounted on the top of the pedestal 36 by means of screws 38.

The geometrical shape of the platform 30 of the present invention, will now be described. The platform 30 is formed with a central planar section 40 for conveying articles, such as cans that lie within the acceptable weight limits, directly along the slide deflector. These cans are not deflected to one side or the other. The central section 40 of the platform is inclined downwardly from the front or article receiving end, to the rear or article delivery end thereof, by an angle "a" that is indicated in FIGURE 2. This angle is approximately 7°. The inclination angle "a" ensures that the momentum imparted to the articles as they leave the classifying device C, is sufficient to cause the article to slide across the slide conveyor R of the present invention,, without need for separate mechanical conveying or article-transporting means.

The platform 30 is formed with an inclined wing section 42, for receiving rejected articles of one classification; that is, underweight articles in the present example. The longitudinal line of bend of the wing section 42 from the central section 40, is indicated at 44, and this line of bend extends generally longitudinally of the platform 30. The wing 42 is inclined from the horizontal central section 40 by an angle "b," FIG. 3, of about 7°. The line of bend 44 is laterally inclined from the longitudinal axis of the platform, by an angle "c," FIG. 1, of approximately 4°.

The other wing is indicated at 46, and this wing receives articles of another classification, which are the overweight articles in the form of the invention being described. The line of bend 48 for the wing 46 is also inclined from the horizontal by an angle "b" of approximately 7°, and is inclined from the longitudinal axis of the platform by an angle "c" of approximately 4°. The lines of bend 44 and 48 for wings 42 and 46, respectively, converge from the article-receiving end of the central section to the article delivery end thereof.

The article deflector assemblies O and U are of the same construction, except that the deflector arms are relatively reversed in position, to provide a right and a left deflecting action. The underweight deflector solenoid assembly U, shown in section in FIGURE 4, will now be described in sufficient detail to enable one skilled in the art to practice the invention. The underweight deflector arm is indicated at 52, and the arm is operated by a rotary solenoid, indicated generally at 54. The rotary solenoid 54 has a rotatable armature 56, which is turned by the lines of force emanating from the solenoid winding 58, the winding being energized by a plug in electrical connection 60. The manner in which the axially directed lines of magnetic force from the solenoid winding 58 are converted into rotary motion of the solenoid armature 56 forms no part of the invention. A device for this purpose, involving cam races and balls, is incorporated in the rotary solenoids manufactured by Ledex, Inc., Dayton, Ohio, and the details of this construction are not part of the present invention.

The solenoid is protected by a cup-shaped cover 62, which is attached to the body of the solenoid by means of a plurality of circumferentially spaced spacer nuts 64, which are threaded on the mounting screws 65 projecting upwardly from the solenoid body. The entire solenoid assembly is mounted on the underside of the platform 30 by means of screws 66 threaded into spacer nuts 64. An extension or adapter shaft 68 is pinned to the stub shaft 69 of the solenoid armature 56, and the deflector arm 52 is pinned to the upper portion of the adapter shaft 68. As mentioned, the overweight solenoid assembly O is of the same construction as that described, except that the deflector arm for the solenoid assembly O is reversed from the right to left, before it is mounted on the adapter shaft 68 of the overweight solenoid assembly.

In operation, when acceptable articles are received from the classifying device C, they enter the slide reject conveyor at the base of the triangular central section 40 of the platform 30. Due to the downward inclination of the entire platform (angle "a," FIG. 2), and due to the momentum of the articles that has been classified, the acceptable articles will continue in a straight line along path "p" (FIGURE 1) and will enter the mid-lane, which is the acceptable lane, of the conveyor belt 24 of the takeaway device T. When the articles leave the central or acceptable section 40 of the platform 30, the takeaway conveyor T receives the articles, which continue on in the direction in which they were received by the slide conveyor of the present invention. Since the takeaway conveyor T is moving at substantially the same linear speed as are the articles on the slide conveyor R, the articles will not deviate appreciably from the mid, or acceptable, path "p" of FIGURE 1, even though they might topple slightly to one wing or the other near the delivery end of the slide conveyor R.

FIGURE 1 illustrates in dot-dash lines the position of the deflector 52 of the overweight reject solenoid assembly O. As seen by the dot-dash lines in FIGURE 1, when the overweight deflector arm 52 is projected into the path of an oncoming article, the distance "d" between the article guiding faces of the deflector arms 52 is but slightly greater than the diameter of the can K (or other article), being segregated by the slide conveyor R.

Thus with the deflector arm 52 of the overweight solenoid assembly O advanced or projected, as seen in FIGURE 1, the direction of the oncoming articles, such as can K, is changed. Due to the convergence of the lines of bend 44 and 48 between the wings and the central section of the platform, the article now rests upon the wing 46 of the platform 30. After the article continues in its new path along the wing 46, due to the inclination of the wing along the line of bend 48 from the central section 40 of the platform through angle "b," FIGURE 3, the force of gravity causes the overweight article to assume the path "o" indicated by dashed lines in FIGURE 1. The path "o" along the reject conveyor R is curved, as a result of both the momentum of the article and the effect of gravity on the article, as it passes along the doubly inclined wing 46. This action increases the separation "s," FIGURE 1, between the path of overweight articles, when they reach the belt 24 of the takeaway conveyor T, and the central path "p" of acceptable articles along the same conveyor belt. Similarly, an underweight article is deflected along a path "u" on the wing 42, and continues along the underweight path on the belt 24 of the takeaway conveyor T, as is also indicated by dashed lines in FIGURE 1.

Thus, adequate separation between the various segregation lanes, or paths, on the takeaway conveyor T is attained, without requiring that the deflector blades 52 to be projected for any great distance into the path of the oncoming articles delivered from the classifying device C. Furthermore, the deflector blades 52 need not remain projected for a long period of time, because of the geometry of the platform 30, with its triangular central section and its doubly inclined wings. These assist in maintaining, and in fact increasing, the spacings of the paths ("u" and "o") of rejected articles from the central or acceptable article path "p." Also, due to the double inclination of the wings 42, 46, and due to the downward inclination of the central section 40, no conveyor belts or other article transport means are required to cause the articles to pass from the classifying device C to the takeaway conveyor T.

Even though the delivery end of the slide conveyor platform 40 of the present invention may be somewhat above the takeaway conveyor belt 24 (FIG. 2), this is immaterial, because articles leaving the slide reject conveyor R will be travelling at a velocity that is substantially equal to the linear velocity of the takeaway conveyor belt 24, so that the articles are not snubbed, and do not topple, as they are transferred by their own momentum from the platform 30 to the takeaway conveyor.

Having described the invention so that those skilled in the art may practice the same, I claim:

1. A slide reject conveyor unit for receiving linearly moving articles from an article classifying device and directing the articles along any one of three paths, namely, a longitudinal path, a right path and a left path, said latter paths diverging from said longitudinal path; said unit comprising a slide platform, means for mounting said platform for receiving articles from the classifying device, said slide platform comprising a longitudinally extending central section having a smooth, flat article supporting face that is inclined downwardly from its article receiving end, said central section being horizontal in lateral section for passing articles along said longitudinal path and off the end of the unit, said platform having a wing section joining each side of said central section, each wing section having a smooth, flat article supporting face inclined downwardly from one side of said central section, said wing section faces forming smooth, lateral continuations of said central section face for passing articles along one of said divergent paths and off the end of the unit, the junction lines between sections and the longitudinal axis of the central section converging in the downstream direction by a relatively small acute angle for providing a gravity force component on articles that slide along said wing sections which augments the gravity component resulting from the downward inclination of said central section in urging the articles longitudinally along the wing sections, and means for selectively deflecting articles from said central section to either wing section.

2. The slide reject unit of claim 1, wherein said article deflecting means comprises a pair of deflector arms, means pivotally mounting said arms on said platform at laterally spaced axes, said deflector arms projecting downstream from their pivots and having opposed, normally divergent short inner faces, said arms passing articles without deflecting them when the arms are in their retracted position, the inner faces of said arms being generally parallel to provide initial article guiding faces when one or the other arm is moved to its article deflecting position for directing articles to one of said wing sections.

References Cited by the Examiner
UNITED STATES PATENTS

| | | | |
|---|---|---|---|
| 1,068,729 | 7/1913 | Bjorkholm | 193—31 |
| 2,566,417 | 9/1951 | Holm | 193—36 |
| 2,815,252 | 12/1957 | Baker | 193—1 |
| 3,078,994 | 2/1963 | Sherer | 209—74 |

SAMUEL F. COLEMAN, *Primary Examiner.*

ANDRES H. NIELSEN, *Examiner.*